Patented Dec. 16, 1952

2,622,081

UNITED STATES PATENT OFFICE 2,622,081

CYCLIC KETAL DERIVATIVES OF STEROIDS AND METHOD OF PREPARING THE SAME

Seymour Bernstein and Rose Mary Antonucci, Pearl River, and Milton D. Heller, Monsey, N. Y., assignors to American Cyanamid Company, New York, N. Y., a corporation of Maine No Drawing. Application December 4, 1951,
Serial No. 259,902

5 Claims. (Cl. 260—239.55)

This invention relates to the preparation of new steroid compounds. More particularly, it relates to derivatives of $\Delta^5$-pregnene-11$\beta$,17$\alpha$,21-triol-3,20-dione and a method of preparation thereof.

Considerable interest has been shown recently in the chemical literature concerning certain compounds of the steroid field. Compounds having a side chain in the 17-position and keto groups in the 3- and 11-positions are of particular interest. One of these compounds which occurs naturally in the adrenal cortex and is commonly referred to as cortisone or Kendall's "Compound E," has been found to be highly active in the treatment of arthritis, rheumatic fever and other pathological conditions broadly classified as rheumatic diseases. The compound cortisone may be described chemically as $\Delta^4$-pregnene-17$\alpha$,21-diol-3,11,20-trione. Kendall has also described a further compound structurally related to cortisone as "Compound F." "Compound F" differs from cortisone in having a hydroxyl radical in place of a keto group in the 11-position. Published results on the activity of "Compound F" have been somewhat meager in the literature primarily because of the very limited amounts of "Compound F" available for clinical study. However, the results reported appear to indicate that "Compound F" may be more active than cortisone itself. Indeed, reports in the literature have indicated that "Compound F," and not cortisone, is the true hormone of the adrenal cortex. It is therefore desirable that a method be available which is capable of producing "Compound F" in good yields.

We have now found that a derivative of cortisone can be directly converted into "Compound F" in good yields. This compound has the following structural formula:

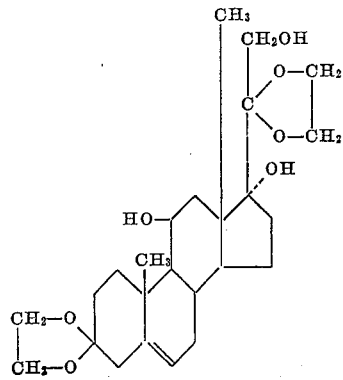

The compound is a solid crystalline material having a definite melting point and being soluble in the usual organic solvents.

The above compound can be prepared by reacting cortisone with a glycol such as ethylene glycol, to form a cyclic ketal protective group in the 3- and 20-positions of the cortisone molecule. These cyclic ketal groups protect the 3- and 20-positions from further reaction and are capable of being transformed into keto groups when desired. The 3,20-di-ethylene ketal of cortisone in solution is then reacted with lithium aluminum hydride in a suitable solvent. The lithium aluminum hydride converts the 11-keto group into a hydroxyl radical to produce the compounds of the present invention.

The compound cortisone is a known compound. The di-ethylene ketal derivative of cortisone may be prepared by methods shown in the examples hereinafter.

In carrying out the process of the present invention we prefer to dissolve the cortisone diethylene ketal in a solvent, such as tetrahydrofuran, and to react the solution with lithium aluminum hydride in a suitable solvent. The latter solvent may be an ether such as diethyl ether; dipropyl ether; dibutyl ether; diamyl ether and the like. The reaction is usually complete within a period of from 15 minutes to two hours, at a temperature from about 20° to 150° C.

The product is obtained from the reaction mixture by treating the reaction mixture with water and separating the ether extract, which is then dried and filtered. The filtrate is evaporated to near dryness under reduced pressure and the residue in the form of a liquid is treated with an organic solvent or a mixture of an organic solvent. Any solid material is filtered off and the filtrate evaporated to dryness under reduced pressure. The product can be further purified by crystallization from one or more organic solvents or mixtures thereof.

The following examples illustrate the preparation of the di-ethylene ketal derivative of cortisone and the further treatment of this derivative to produce the compound of the present invention.

A mixture of 850 mg. of cortisone, 7 ml. of ethylene glycol and 30 ml. of benzene was distilled for a short time for removal of traces of water. Twenty-six milligrams of para-toluenesulfonic acid monohydrate was added and the mixture was refluxed and stirred for 21 hours with continuous removal of water. Sodium bicarbonate solution was added to the cooled mixture and the product was worked up in a mixture of benzene and ether. The benzene-ether extract was washed with water, dried with magnesium sulfate and filtered. The filtrate was evaporated under reduced pressure. The residue was recrystallized from acetone-petroleum ether (boiling point 64°–66° C.), weight 260 mg., melting point 235°–239° C. Recrystallization of the $\Delta^5$-pregnene-17$a$,21-diol-3,11,20-trione-3,20-diethylene ketal (cortisone di-ethylene ketal) from acetone-petroleum ether (boiling point 64°–66° C.) did not alter the melting point $[a]_D^{26}$—7.5° (chloroform).

A solution of 150 mg. of cortisone di-ethylene ketal in 10 ml. of tetrahydrofuran was treated with 3 ml. of a stock solution of lithium aluminum hydride in butyl ether (about 0.1 molar). The mixture was refluxed for one hour, treated cautiously with water and the product was worked up in ether. The ether extract was washed with water, dried with magnesium sulfate and filtered. The filtrate was evaporated to near dryness under reduced pressure. The residual liquid was treated with acetone and petroleum ether (boiling point 64°–66° C.). This gave 30 mg. of solid which was separated. The mother liquor was evaporated to dryness under reduced pressure and the residue was treated with ether, acetone and petroleum ether (boiling point 64–66° C.) and was allowed to stand at room temperature in an open flask. Spontaneous evaporation of the solvents gave a solid residue which was removed mechanically from the flask. A yield of 72 mg. of $\Delta^5$-pregnene-11$\beta$,17$a$,21 - triol - 3,20 - dione-3,20-di-ethylene ketal was obtained, having a melting point of 177°–182° C. An infrared absorption spectrum analysis showed the absence of carbonyl groupings.

We claim:

1. A compound having the following formula:

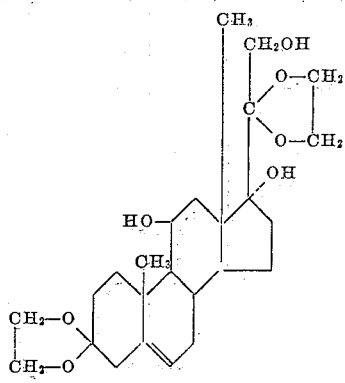

2. A method of preparing the compound having the formula:

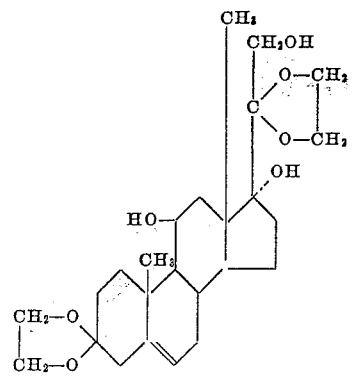

which comprises reacting cortisone di-ethylene ketal in solution with lithium aluminum hydride in a solvent and recovering said compound therefrom.

3. A method in accordance with claim 2 in which the cortisone di-ethylene ketal is dissolved in tetrahydrofuran.

4. A method in accordance with claim 2 in which the cortisone di-ethylene ketal is dissolved in tetrahydrofuran and the solvent is dibutyl ether.

5. A method of preparing $\Delta^5$ - pregnene-11$\beta$,17$a$,21 - triol-3,20-dione di-ethylene ketal which comprises heating cortisone with ethylene glycol to produce cortisone 3,20-di-ethylene ketal, subsequently reacting this product with lithium aluminum hydride in a solvent and recovering said compound therefrom.

SEYMOUR BERNSTEIN.
ROSE MARY ANTONUCCI.
MILTON D. HELLER.

No references cited.